United States Patent [19]

Huang et al.

[11] Patent Number: 5,666,866
[45] Date of Patent: Sep. 16, 1997

[54] FOOD PRODUCT SLICING MACHINE INCORPORATING A SCALE

[75] Inventors: Joseph Chun-Chi Huang, Dayton; James Alan Shirk, Union; James Franz Yoder, West Chester, all of Ohio

[73] Assignee: Premark FEG L.L.C., Wilmington, Del.

[21] Appl. No.: 425,919

[22] Filed: Apr. 20, 1995

[51] Int. Cl.⁶ .................................................. B26D 7/30
[52] U.S. Cl. ............................... 83/77; 83/932; 177/243; 177/253; 177/262
[58] Field of Search ............................ 83/77, 932, 703, 83/707, 719, 730; 177/253, 262, 245, 243, 238, 239

[56] References Cited

U.S. PATENT DOCUMENTS

| | | | |
|---|---|---|---|
| 3,452,833 | 7/1969 | Wolters | 83/77 X |
| 3,938,602 | 2/1976 | Sly et al. | 83/77 X |
| 4,065,911 | 1/1978 | Fagan | 53/53 |
| 4,136,504 | 1/1979 | Wyslotsky | 53/435 |
| 4,216,689 | 8/1980 | Suhling | 83/77 |
| 4,217,650 | 8/1980 | Kuchler | 364/567 |
| 4,309,927 | 1/1982 | Dennis et al. | 83/77 |
| 4,321,847 | 3/1982 | Dillon | 82/77 |
| 4,379,416 | 4/1983 | Kuchler | 83/23 |
| 4,545,447 | 10/1985 | Spooner et al. | 177/165 |
| 4,548,107 | 10/1985 | Marchese et al. | 83/23 |
| 4,548,108 | 10/1985 | Dennis | 83/27 |
| 4,598,618 | 7/1986 | Kuchler | 83/77 |
| 4,603,610 | 8/1986 | Whitehouse | 83/13 |
| 4,615,405 | 10/1986 | Morino et al. | 177/245 X |
| 4,763,738 | 8/1988 | Kuchler | 177/50 |
| 4,794,996 | 1/1989 | Wallace et al. | 177/25.14 |
| 4,813,316 | 3/1989 | Johnson et al. | 83/42 |
| 4,867,257 | 9/1989 | Kuchler | 177/25 |
| 4,868,951 | 9/1989 | Akesson et al. | 17/54 |
| 4,894,976 | 1/1990 | Wallace et al. | 53/435 |
| 4,941,375 | 7/1990 | Kasper | 83/23 |
| 5,042,340 | 8/1991 | Kasper | 83/73 |
| 5,107,731 | 4/1992 | Kent | 83/91 |
| 5,109,936 | 5/1992 | Ruppel | 177/25.19 |
| 5,241,885 | 9/1993 | Kuchler | 83/76.7 |
| 5,580,475 | 12/1996 | Antonissen | 83/71 |

FOREIGN PATENT DOCUMENTS

| | | | |
|---|---|---|---|
| 0392638 | 10/1990 | European Pat. Off. | 177/245 |
| 0202837 | 11/1983 | Japan | 177/238 |
| 402141625 | 5/1990 | Japan | 177/253 |
| 404328426 | 11/1992 | Japan | 177/262 |
| 8701375 | 1/1989 | Netherlands | 83/77 |

OTHER PUBLICATIONS

Hobart Catalog of Replacement Parts, Slicers (1993).
Nist Handbook 44, 1992 pp. iii, 1–2 and A1–A8.
Considered by Examiner blc the Applicant Declared it as Prior Art, see paper No. 4 (undated).

Primary Examiner—Rinaldi I. Rada
Assistant Examiner—Boyer Ashley
Attorney, Agent, or Firm—Thompson Hine & Flory LLP

[57] ABSTRACT

A food product slicer comprises a housing having a bilevel profile which includes a raised portion having a first aperture therein and a horizontal planar portion having a second aperture therein; a slicing blade mounted for rotation on a drive shaft extending through the first aperture; a compartment on the bottom side of the housing defined by a wall member; a scale including a platter, mounted on a post extending through the second aperture; a load cell mounted in the compartment and engaging the post extending through the second aperture; and an electronic control for operating the scale and slicer, mounted in the housing outside of the compartment. The platter is located below the slicing blade such that the food product sliced by the slicing blade is deposited on the platter, and the post is mounted to the center of the platter, such that a food product portion deposited on the platter will measure substantially the same weight on each corner of the platter. The invention also comprises a display, electrically coupled to the scale, for providing a readout of the weight of the food product portion deposited on the scale. The display is oriented for viewing by at least one person other than the operator, i.e., the customer. Therefore, the centered mounting of the platter to the post and the orientation of the display both facilitate the scale as being certifiable as "Legal for Trade."

3 Claims, 6 Drawing Sheets

FOOD PRODUCT SLICING MACHINE INCORPORATING A SCALE

FIELD OF THE INVENTION

The present invention relates to a food product slicing machine incorporating a scale.

BACKGROUND OF THE INVENTION

Grocery stores, delicatessens and restaurants sell bulk food products which are sliced and weighed according to each customer's order or receipt. Conventionally, to determine the weight of food product requested by the customer, the operator visually estimates the weight of the food product being sliced and then transfers it to a separate scale to determine the exact weight of the cut product. This usually results in the customer receiving either too much or too little cut food product. This process requires the operator to make several trips between the slicer and the scale to determine the exact weight requested by the customer. Rarely can the operator "eyeball" the exact weight amount.

In an effort to solve the problem of interrupting the slicing operation to place already cut slices on a separate scale to verify their weight, slicers have been developed incorporating estimating scales which automatically weigh the product as it is sliced. The scale on these slicers is generally positioned so that it will catch the food product as it is cut by the slicing blade. Although these slicers diminish the number of trips the operator must make to determine the approximate weight of the cut product, the operator must still make a trip to a separate scale to weigh the product on a governmentally inspected device so that he can price the cut food product. The food product must be transferred from the food product slicer bearing an estimating scale to a scale which is "Legal for Trade," i.e. a scale which has been inspected and approved by a governmental agency which inspects weighing and measuring devices.

To be "Legal for Trade" a scale can be certified by the standards set forth in the National Conference on Weights & Measures (NCWM) Handbook 44 requirements entitled "Specifications, Tolerances, and Other Technical Requirements for Weighing and Measuring Devices" published by the National Institute for Standards and Technology. Among other requirements, the scale must be certifiable by the appropriate governmental agency and have a readout which a customer can view.

In the past, design restrictions have prevented the scales associated with slicers from meeting the requirements necessary to be certified as "Legal for Trade." For example, U.S. Pat. No. 5,107,731 to Kent describes a slicing machine which incorporates a weight sensor means. The weight sensor is connected to a platform which oscillates in synchronization with the food product carriage. The platform from which the weight of the sliced product is determined does not remain in a constant, fixed position as the cutting operation is taking place. This constant movement and vibration of the platform may produce inaccuracies in the weight of the cut food product when the platform is stopped to weigh the product. Although these inaccuracies may only be minor, they would fall outside the acceptable tolerances and prevent the scale from being certified as "Legal for Trade."

As another example, U.S. Pat. No. 4,763,738 to Kuchler also describes a slicing machine which incorporates a scale. Because the load cell of Kuchler interfaces with a support located off-center of the weighing platform, it is also unlikely that this design could be certifiable as "Legal for Trade." It is probably not certifiable because one of the requirements for a "Legal for Trade" scale is that a food product portion placed on the scale must weigh the same on each corner of the weighing platform. Further, the slicing machine does not include a readout viewable by a customer.

Consequently, in the food product slicing field, there exists a need for an inexpensive food product slicer which incorporates a "Legal for Trade" scale.

SUMMARY OF THE INVENTION

The present invention concerns a food product slicer which incorporates a "Legal for Trade" scale. The slicer includes a housing designed so that the slicing machine can conform with National Sanitary Foundation requirements regarding the sanitary conditions of food product slicers and the NCWM Handbook 44 requirements. Further, because the slicer is designed to conform to the NCWM standards, it should conform with state regulations regarding the accuracy of weighing devices used to weigh items sold to the general public.

In particular the slicer has a housing having a top side, a bottom side, and a bilevel profile. The bilevel profile has a raised portion having a first aperture therein and a horizontal planar portion having a second aperture therein. A slicing blade is mounted for rotation on a drive shaft which extends through the first aperture. A first wall member defines a first compartment on the bottom side of the housing. The slicer also includes a scale. The scale has a platter mounted on a post which extends through the second aperture and a load cell, detachably engaged by the post, mounted in the first compartment. The scale also includes electronic control, for operating the scale and slicer, mounted on the bottom side of the housing outside of the first compartment. The platter is located with respect to the slicing blade so that the slices of a food product sliced by the slicing blade are deposited on the platter. Further, by enclosing the load cell and second aperture in the first compartment, food product debris is directed downward from the slicer base preventing the food product debris from flowing from the first compartment into the second compartment and contaminating the electronics for the scale.

BRIEF DESCRIPTION OF THE DRAWINGS

The foregoing summary, as well as the following detailed description of the preferred embodiment, is better understood when read in conjunction with the attached drawings. For the purpose of illustrating the invention, the drawings show a typical embodiment of the invention. However, one understands that the invention is not limited to the specific methods and depictions shown. In the drawings.

DETAILED DESCRIPTION OF THE INVENTION

Figure 1:
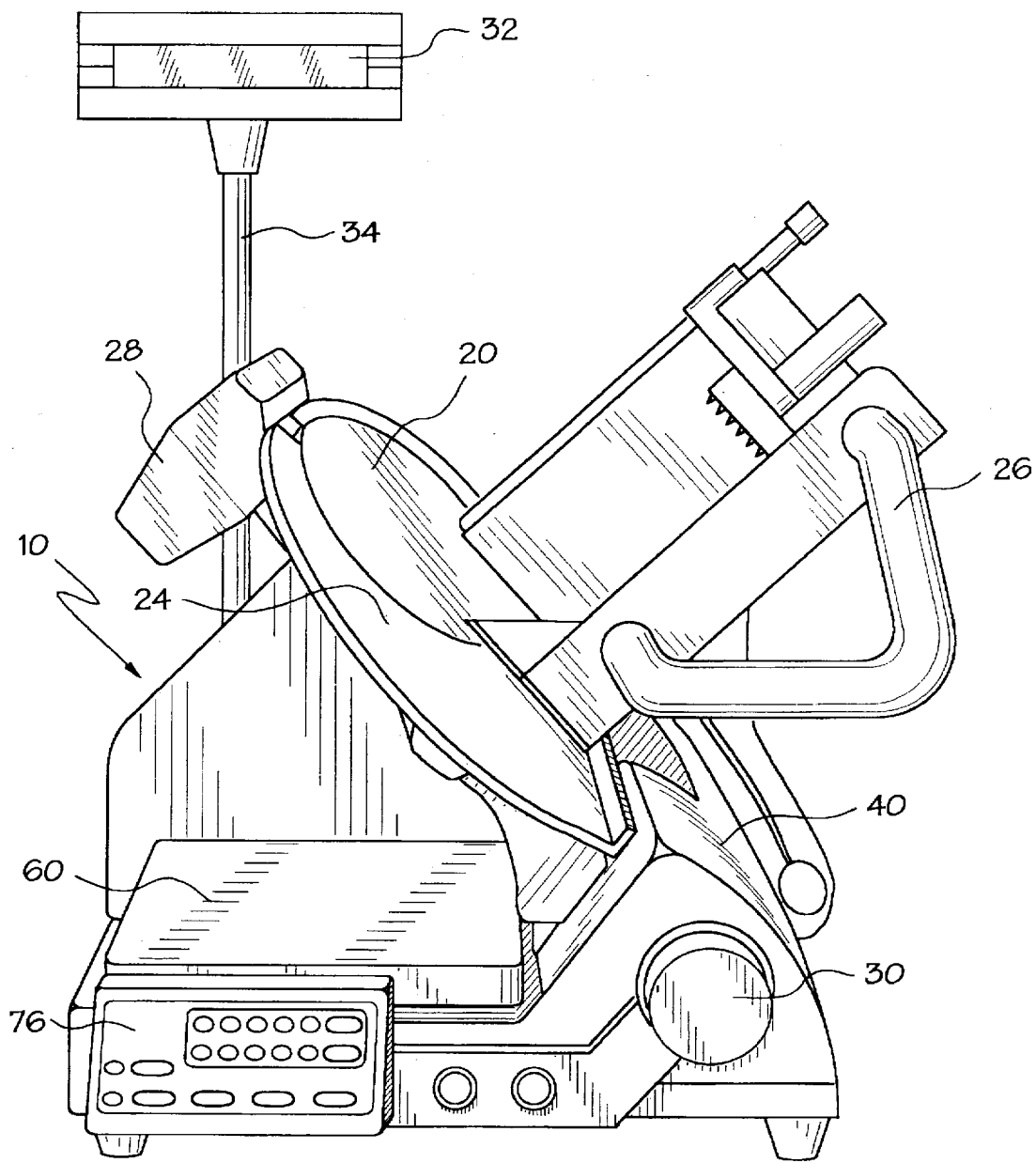
FIG. 1 presents a perspective view of a food product slicer of this invention.

FIG. 1 presents a perspective view of a food product slicer 10. Food product slicer 10 includes a motor, not shown, a slicing blade 20, a gauge plate 24, a product support carriage 26, a blade sharpener 28, an adjustment knob 30, a digital display 32, a housing 40, a scale 60 and a keypad 76. Slicing blade 20 and gauge plate 24 are conventional and mounted on housing 40 of the slicer 10. Slicer 10 conventionally includes a product support carriage 26 which is reciprocated either manually by the machine operator or driven by a motor in the case of an automatic slicer. The motor rotates slicing blade 20 by means of a fixed-axis shaft (not shown). Gauge plate 24 is movable axially with respect to the plane of the blade 20 for determining slice thickness. Gauge plate 24 can also be located at a "closed" position at which it covers that portion of the periphery of the blade edge, which is usually exposed during a cutting operation. Blade sharpener 28 is mounted on housing 40 so that it is movable from a position at which it contacts blade 20 for sharpening to a retracted position at which it does not contact blade 20. Adjustment knob 30 is conventional and is provided to adjust the positioning of gauge plate 24 relative to blade 20. Display 32 is rotatably mounted on support post 34. Scale 60 includes a scale platform 62 on which food product slices are deposited for weighing. Keypad 76 is also mounted on housing 40 and is used to enter information for the operation of scale 60. One skilled in the art will appreciate that display 32 and keypad 76 can be remotely mounted without affecting the operation of slicer 10 and scale 60.

Figure 2:
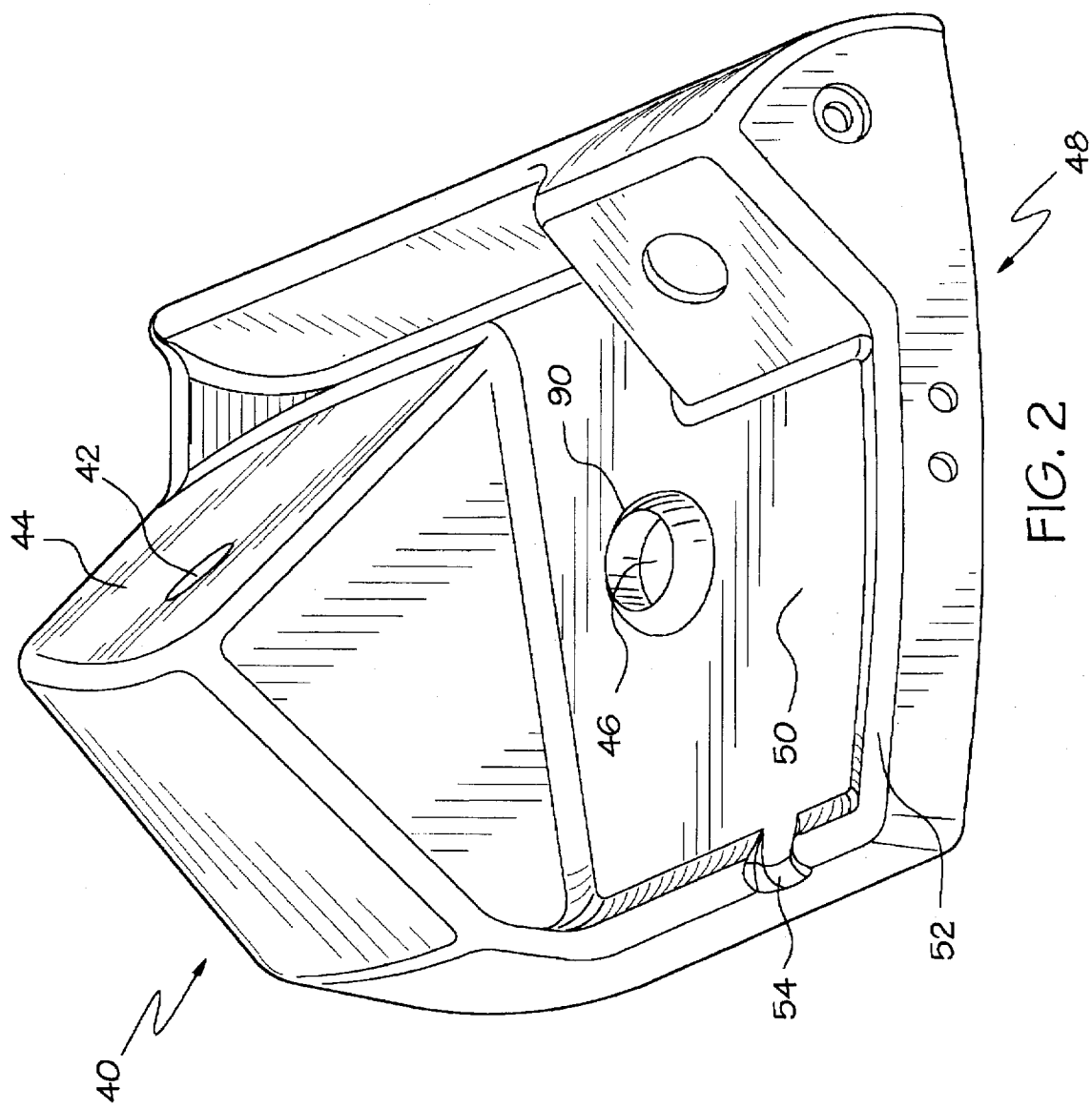
FIG. 2 presents a perspective view of the top of housing of the food product slicer.

FIG. 2 shows a perspective view of the top side of housing 40. Housing 40 includes a first aperture 42, a raised portion 44, a second aperture 46, a horizontal portion 48, a well 50, a lip 52 and a slot 54. First aperture 42 is located in raised portion 44. The fixed axis shaft of slicing blade 20 extends through aperture 42 to engage the motor. Second aperture 46 is centrally located in horizontal portion 48. Lip 52 extends around two sides of the perimeter of horizontal portion 48 creating well 50. Slot 54 is located in lip 52. Raised annular portion 90 encircles second aperture 46 and extends above the surface of well 50. Typically, raised annular portion 90 has a cross sectional height which exceeds the height of lip 52. Raised annular portion 90 can be formed as part of the casting of housing 40, or can be a separate piece, such as a ring, which is inserted into second aperture 46. If raised annular portion 90 is a separate piece such as a ring, it may optionally be secured to well 50 by any conventional fastening or sealing method.

Figure 3:
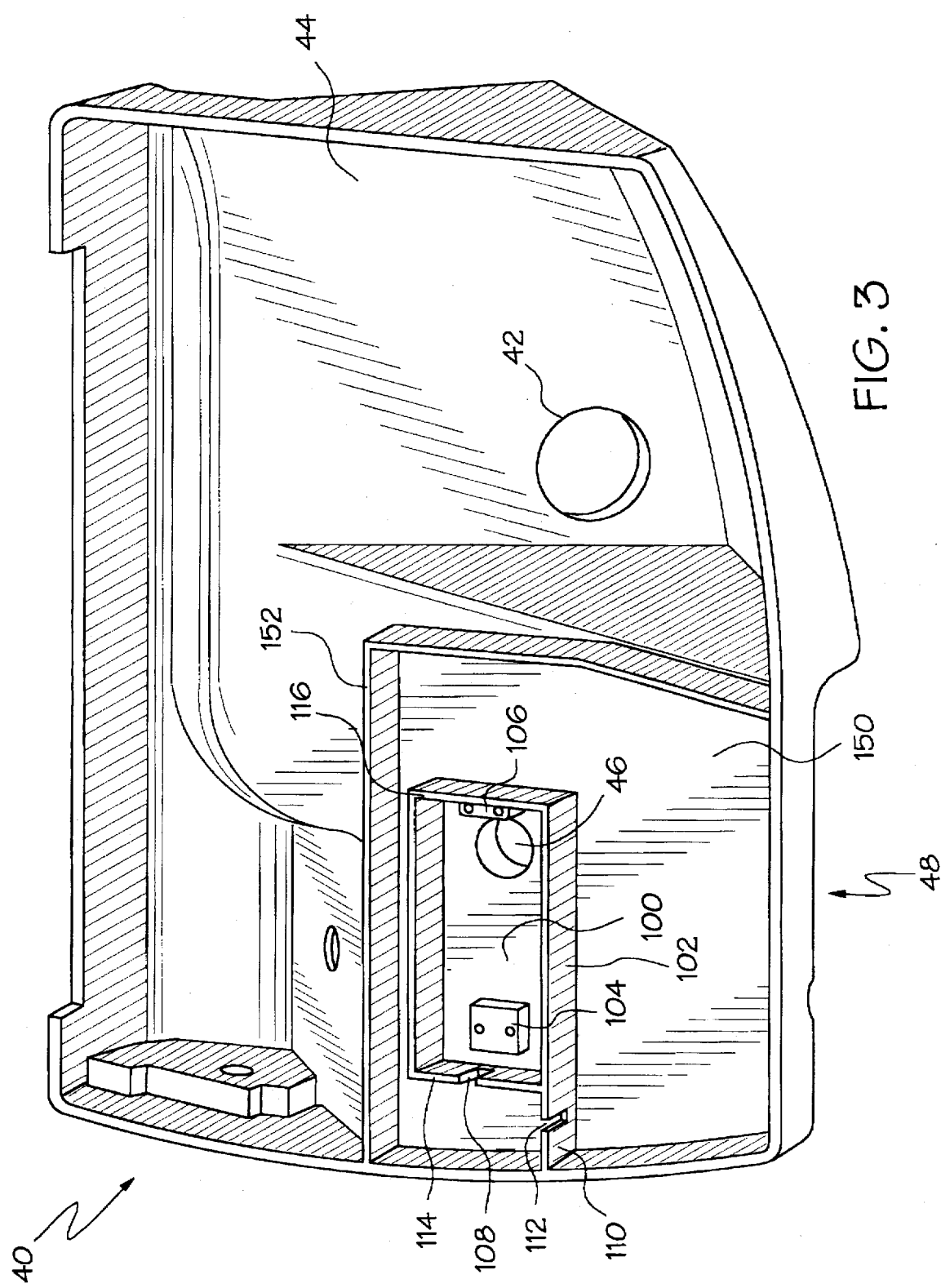
FIG. 3 presents a perspective view of the bottom of the housing.
Figure 3A:
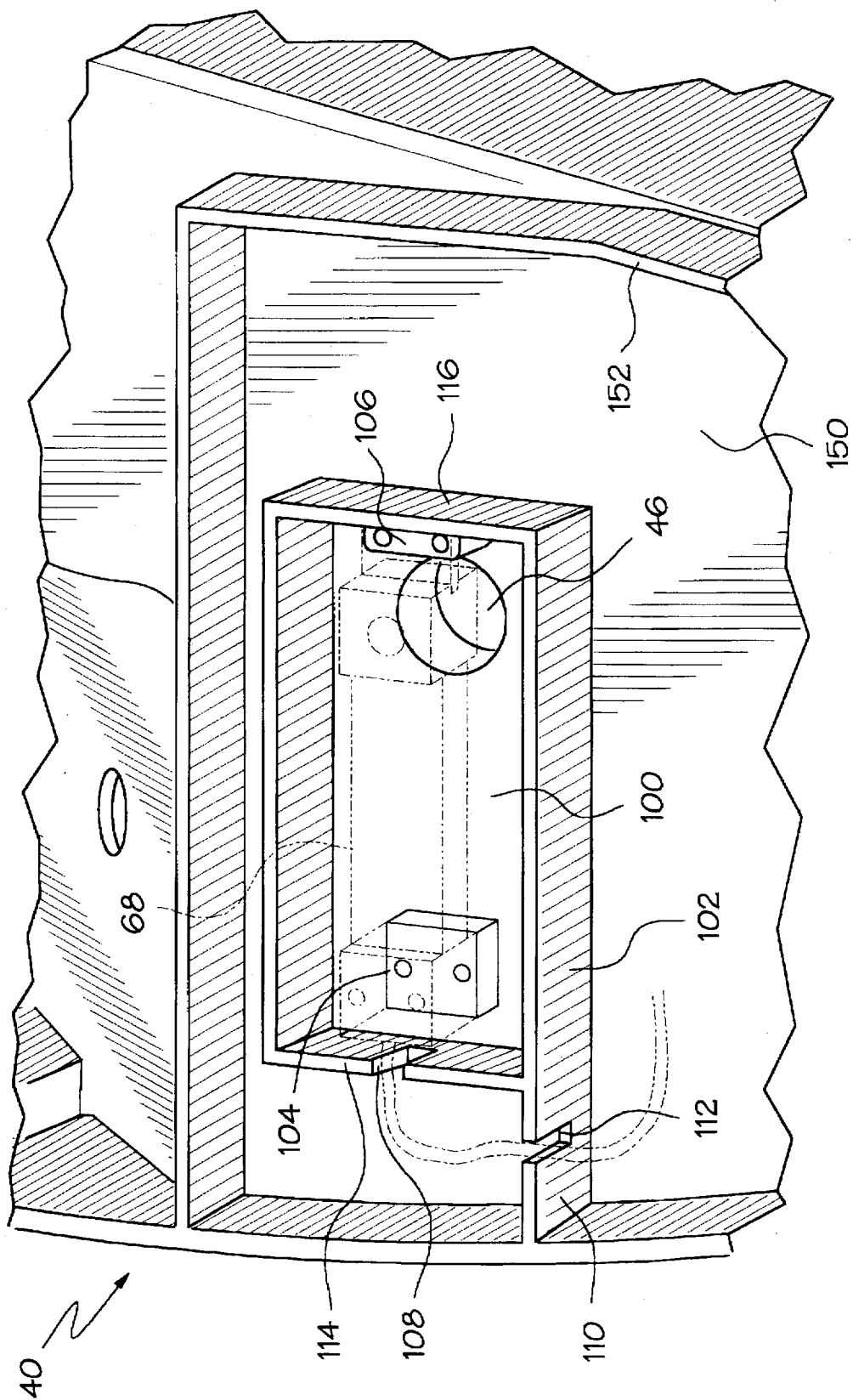
FIG. 3A presents an enlarged perspective view of the first compartment.

FIGS. 3 and 3A present views of the bottom side of housing 40. The bottom of housing 40 has a first compartment 100 which is formed by first wall member 102. Aperture 46 is located within compartment 100. First wall member 102 forms a first end 114 and a second end 116 of compartment 100. First boss 104 is mounted near first end 114 of wall 102. Second boss 106 is mounted on the second end 116 of wall 102. Second aperture 46 is located near the second end 116 of wall 102. First end 114 of wall 102 has a slot 108 formed therein. Optionally, wall 102 may include a wall extension 110 which has slot 112 therein. The area which lies outside of compartment 100 and wall 102 forms a second compartment 150. Second compartment 150 may optionally be enclosed by a second wall 152 which approximately encompasses the perimeter of the bottom side of well 50.

Figure 4:
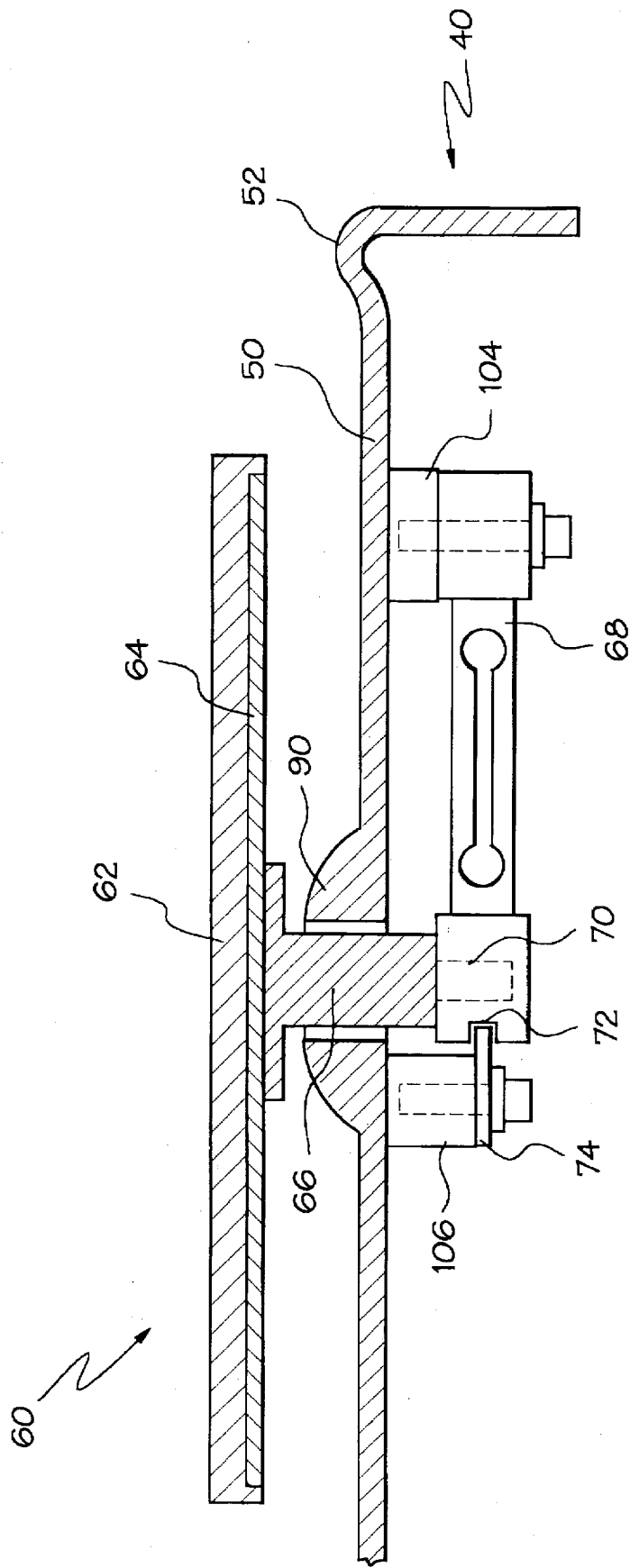
FIG. 4 presents a cross-sectional view of the scale mechanism.

FIG. 4 presents a cross-sectional view of the components of scale 60. Scale 60 comprises a platter 62, a subplatter 64 having a subplatter post 66, a load cell 68 and a travel stop 74. Platter 62 is detachably mounted upon subplatter 64. Subplatter post 66 extends downwardly from and is centrally positioned beneath subplatter 64. In particular, subplatter post 60 extends through second aperture 46 and raised annular portion 90 to detachably engage aperture 70 in load cell 68. Load cell 68 is mounted on first boss 104 in the first compartment 100. Load cell 68 has an aperture 70 and a slot 72 machined therein. Travel stop 74 is mounted on and extends from boss 106 in second end of wall 102. Travel stop 74 engages slot 72 in load 68 to prevent load cell 68 from being damaged by excessive weights, as described below.

Figure 5:
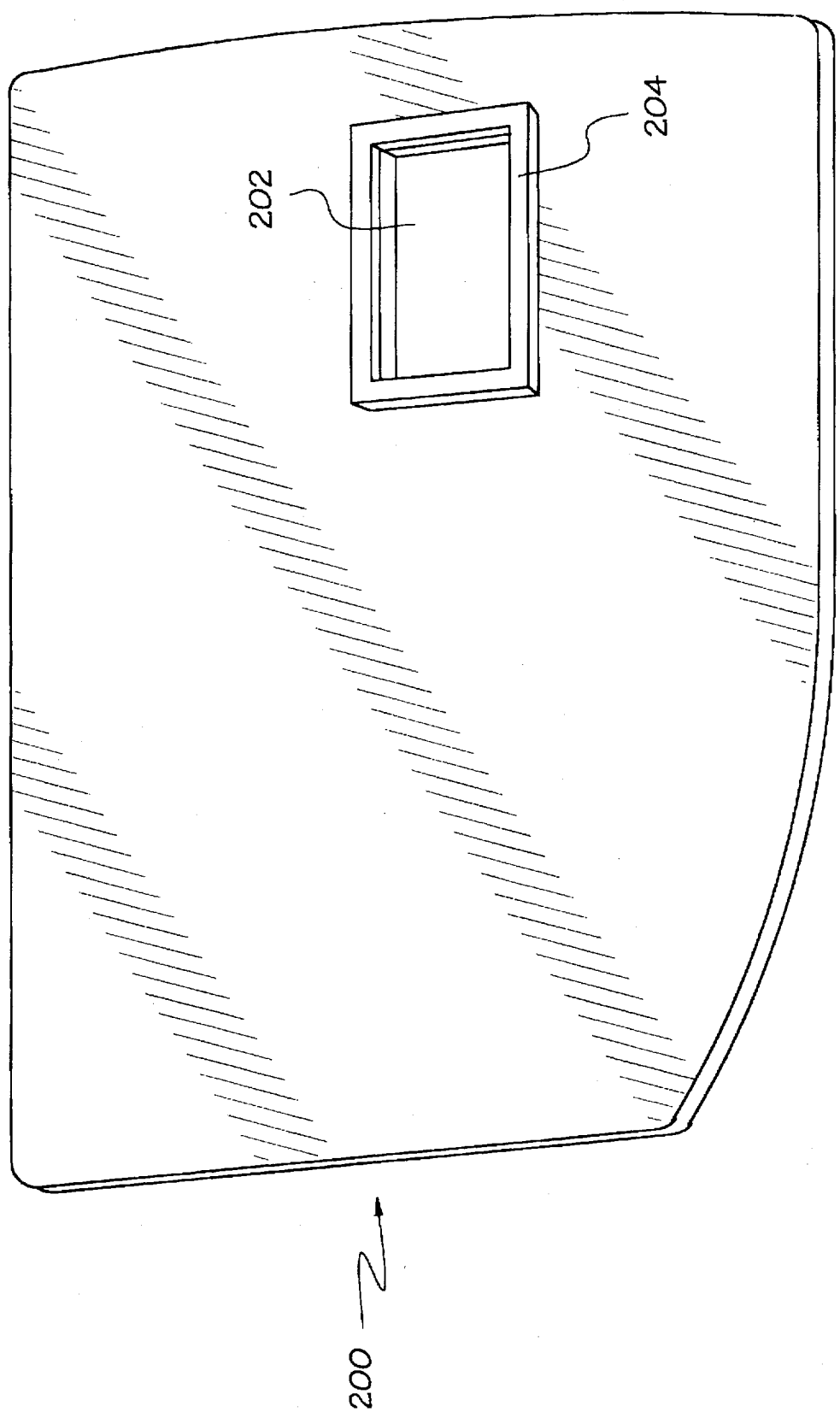
FIG. 5 presents a perspective view of the slicer base.

Base 200 of slicing machine 10 is depicted in FIG. 5. Base 200 has an aperture 202 therein. Aperture 202 is positioned on base 200 in a position which corresponds with the inner perimeter of wall 102 when base 200 is joined to housing 40. Gasket 204 encompasses the perimeter of aperture 202. In an alternate embodiment of base 200, a wall member replaces gasket 204. The wall member engages a corresponding gasket (not shown) which replaces wall member 102 and encompasses first compartment 100.

The food product slicer 10 includes a control system and display 32 (e.g., liquid crystal or the like) for displaying information to the operator and customer, such as current weight, total cost, etc. Scale 60 also includes a keypad 76 for entering relevant information regarding the purchase. Upon the control system receiving the parameter information which the operator desires, the operator presses the slicer start button (not shown) and begins the slicing operation. The specific type of control system employed is not pertinent to the present invention. That is, the choice of the control system and its program are within the ken of one skilled in the art and, therefore, further description of the specifics thereof is neither necessary nor limiting.

Compartment 150 contains the electronic components (not shown) of slicing machine 10 and scale 60. These electronic components are conventional and entirely within the ken of one skilled in the art so they will not be discussed in detail here. The electronic components are protected from being contacted by food product debris by wall member 102, as described in more detail below. The electrical leads, shown in phantom lines in FIG. 3A, from load cell 68 are routed through slot 108 in first end 114 of wall member 102 and into compartment 150. When housing 40 includes optional wall extension 110, the leads will also be routed through slot 112 in wall 110.

When base 200 is joined to housing 40, gasket 204 engages wall member 102 to form a seal between wall member 102 and base 200. This seal inhibits the flow of food product debris from compartment 100 into contact with the electronic components of slicing machine 10, as described in further detail below. When base 200 is positioned on slicing machine 10, aperture 46 and load cell 68 remain exposed. In an alternate embodiment, base 200 has a wall member extending therefrom and housing 40 includes a gasket in place of wall member 102. When base 200 is joined to housing 40, the gasket on the underside of housing 40 engages wall member on base 200 to form compartment 100 and seal compartment 100 from compartment 150. Again, after base 200 has been joined to housing 40, aperture 46 and load cell 68 remain exposed. In both embodiments, because compartment 100 is open to the table on which the slicing machine 10 rests, food product debris flows through compartment 100 and onto the table below. This arrangement of compartment 100 also allows for easier cleaning of both compartment 100 and load cell 68, as described below.

To prevent damage to load cell 68 caused by overloading of platter 62, or damage caused by a force from beneath slicing machine 10, slicing machine is equipped with travel stop 74. Travel stop 74 extends from boss 106 and engages slot 72 in load cell 68. Slot 72 is provided with enough tolerance to allow load cell 68 to accurately weigh portions but not too much tolerance to allow the load cell to become damaged when an excess load is applied. The extent to which load cell 68 is permitted to move freely is determined by the range of weight of food products over which the particular slicing machine 10, and, in particular, scale 60 are designed to be used. One skilled in the art will appreciate the tolerance provided by slot 72 will vary for each weight range over which each scale 60 is used.

To comply with state and local standards regarding commercial weighing and measuring devices, scale 60 must accurately provide the weight of each portion of food product which has been sliced. To provide an accurate weight, the portion must register the same weight regardless of the position at which it is placed on platter 62. By centrally locating post 66 beneath platter 62 and subplatter 64, scale 60 can provide an accurate weight of a portion regardless of its positioning on platter 62. The positioning of post 66 allows scale 60 to provide repeated accurate portion measurements. These repeated, accurate portion measurements comply with state commercial weighing and measuring standards and allow the weights generated by scale 60 to be used in commerce as a basis of price, i.e., to permit scale 60 to be "Legal for Trade."

Slicing machine 10 is designed to inhibit the flow of food product debris, such as food particles and juices, from coming into contact with the electronic components, located in compartment 150, of slicing machine 10 and scale 60 in two ways. First, raised annular portion 90 has a cross sectional height which extends above the surface of well 50. The distance to which raised annular portion 90 extends above the surface of well 50 inhibits the flow of food product debris from well 50 into aperture 46. Typically, raised annular portion 90 has a cross sectional height which exceeds the cross sectional height of lip 52. The height of raised annular portion 90 above the surface of well 50 inhibits the flow of food product debris into aperture 46 and compartment 100. Thus, raised annular portion 90 reduces the opportunity for food product debris to flow from the top to the bottom of housing 40. Raised annular portion 90 causes the food product debris to collect on the surface of well 50 where it can be easily cleaned, as described below.

To prevent food product debris and, in particular, food product juices from accumulating in well 50 and flowing over raised annular portion 90 into compartment 100, housing 40 includes slot 54 in lip 52. Slot 54 allows accumulated food product juices to flow off the surface of well 50 without flowing into compartment 100. Thus, the flow of food product juices over raised annular portion 90 is further limited by the casting of housing 40. Once the juices flow out slot 54, they can easily be wiped off the table or support on which slicer 10 rests.

The second means of inhibiting the flow of food product debris into contact with the electronic components of the slicer 10 and scale 60, is wall member 102. Wall member 102 provides a barrier between first compartment 100 and second compartment 150. When base 200 engages housing 40 and gasket 204 engages wall member 102, first compartment 100 is sealed from second compartment 150 by means of the engagement between wall member 102 and gasket 204. This seal causes food product debris to flow through aperture 46, first compartment 100, and on to the supporting table beneath the slicer 10 without having access to compartment 150.

The design of the scale 60 permits the scale area of the slicing machine 10 to be easily cleaned. As shown in FIG. 4, platter 62 is detachably mounted on subplatter 64. Post 66 extends through second aperture 46 in well 50 and detachably engages aperture 70 in load cell 68. To clean the scale area, platter 62 is removed from subplatter 64. Platform post 66 is then removed from contact with aperture 70 in load cell 68. Once platter 62 and subplatter 64 have been removed from slicing machine 10, well 50, platform 62, subplatter 64 and platform post 66 can be cleaned with a rag or other cleaning device. Because slot 54 is provided in lip 52, the debris can be wiped off of the surface of well 50 away from aperture 46 and through slot 54. The area around load cell 68 in compartment 100 may also be cleaned by tipping the slicer and wiping the area around load cell 68 in compartment 100. Finally, the remainder of the food debris can be cleaned from the table on which slicing machine 10 rests.

Having described the invention in detail and by reference to preferred embodiments thereof, it will be apparent that modifications and variations are possible without departing from the scope of the invention defined in the appended claims.

What is claimed is:

1. A food product slicer comprising:

a housing having a top side, a bottom side, and a bilevel profile, the bilevel profile including a raised portion having a first aperture therein and a horizontal planar portion having a perimeter and a second aperture therein;

a slicing blade mounted for rotation on a drive shaft which extends through the first aperture;

a first compartment on the bottom side of the housing, the first compartment being defined by a first wall member surrounding the second aperture;

a scale including a platter supported by a post which extends through the second aperture, the platter having a center and a plurality of corners, and the post being centered with respect to the platter such that the scale measures the same weight for a food product portion deposited on any corner of the platter;

a subplatter having a top side, a bottom side and a center, wherein the platter is mounted on the top side of the subplatter and wherein the post is mounted to the center of the subplatter a load cell mounted in the first compartment, the post engaged by the load cell;

an electronic control for operating the scale and slicer mounted on the bottom side of the housing outside of the first compartment;

a base mounted to the bottom side of the housing;

a gasket mounted on the base and positioned between the base and the first wall member, which seals the first wall member to the base and seals the first compartment from the electronic control such that food particles entering the first compartment through the second aperture are prevented from contacting the electronic control;

a second wall member extending between the housing and the base to define a second compartment, the second compartment surrounding the first compartment and housing the electronic control; and a travel stop associated with the load cell and mounted in the first compartment to prevent damage to the load cell caused by excessive force on the scale;

wherein the base includes an aperture therein and the gasket surrounds the aperture in the base such that food particles entering the first compartment through the second aperture can exit the first compartment though the aperture in the base;

wherein the platter is located below the slicing blade such that food product sliced by the slicing blade is deposited on the platter; and wherein the housing includes,
a lip at the perimeter of the horizontal portion having a cross sectional height, and
a raised annular ring, separately attached to the housing, having a cross sectional height greater than the cross sectional height of the lip, and encircling the second aperture to inhibit the flow of food product debris through the second aperture and into the first compartment.

2. A food product slicer comprising:

a housing having a top side, a bottom side, and a bilevel profile, the bilevel profile including a raised portion having a first aperture therein and a horizontal planar portion having a perimeter and a second aperture therein;

a slicing blade mounted for rotation on a drive shaft which extends through the first aperture;

a first compartment on the bottom side of the housing, the first compartment being defined by a first wall member surrounding the second aperture;

a scale including post extending through the second aperture and a platter, having a center and a plurality of corners, removably mounted to the post and located with respect to the post such that the scale measures the same weight for a food product portion deposited on any corner of the platter;

a load cell mounted in the first compartment, the post engaged by the load cell;

an electronic control for operating the scale and slicer mounted on the bottom side of the housing outside of the first compartment;

a base mounted to the bottom side of the housing;

a sealing means for sealing the first compartment from the electronic control such that food particles entering the first compartment through the second aperture are prevented from contacting the electronic control; and a second wall member extending between the housing and the base to define a second compartment, the second compartment surrounding the first compartment and housing the electronic control;

wherein the base includes an aperture therein and the sealing means surrounds the aperture in the base such that food particles entering the first compartment through the second aperture can exit the first compartment though the aperture in the base; and wherein the platter is located below the slicing blade such that food product sliced by the slicing blade is deposited on the platter.

3. The food product slicer of claim 2, further comprising a display electrically coupled to the scale and oriented for viewing by at least one person other than an operator of the scale.

* * * * *